(12) United States Patent
Benchikhi et al.

(10) Patent No.: US 11,142,137 B2
(45) Date of Patent: Oct. 12, 2021

(54) VEHICLE TRIM COMPRISING A DISPLAY SCREEN AND MANUFACTURING METHOD

(71) Applicant: FAURECIA INTERIEUR INDUSTRIE, Nanterre (FR)

(72) Inventors: Zakaria Benchikhi, Massy (FR); Francois Floch, Chantilly (FR); Omar Ben Abdelaziz, Beauvais (FR)

(73) Assignee: FAURECIA INTERIEUR INDUSTRIE, Nanterre (FR)

( * ) Notice: Subject to any disclaimer, the term of this patent is extended or adjusted under 35 U.S.C. 154(b) by 78 days.

(21) Appl. No.: 16/258,063

(22) Filed: Jan. 25, 2019

(65) Prior Publication Data
US 2019/0232887 A1     Aug. 1, 2019

(30) Foreign Application Priority Data
Jan. 30, 2018   (FR) ...................... 1850736

(51) Int. Cl.
*B60R 13/02* (2006.01)
*B60K 35/00* (2006.01)
(Continued)

(52) U.S. Cl.
CPC .............. *B60R 13/02* (2013.01); *B60K 35/00* (2013.01); *B60K 37/00* (2013.01); *B60K 37/04* (2013.01); *B60Q 3/14* (2017.02); *B60Q 3/54* (2017.02); *B60R 13/0256* (2013.01); *G06F 1/1656* (2013.01); *B60K 2370/1438* (2019.05); *B60K 2370/152* (2019.05); *B60K 2370/28* (2019.05); *B60K 2370/339* (2019.05);
(Continued)

(58) Field of Classification Search
CPC ................ B60R 13/02; B60R 13/0256; B60R 2013/0287; B60K 35/00; B60K 37/04; B60K 37/00; B60K 2370/81; B60K 2370/1438; B60K 2370/688; B60K 2370/339; B60K 2370/28; B60K 2370/152; B60K 2370/98; G06F 1/1656; B60Q 3/14; B60Q 3/54
USPC ........................................................ 296/1.08
See application file for complete search history.

(56) References Cited

U.S. PATENT DOCUMENTS

| 2011/0157906 | A1* | 6/2011 | Oeuvrard | ................ | B60R 13/02 362/488 |
| 2012/0063154 | A1* | 3/2012 | Cannon | .................... | B60Q 3/64 362/490 |

(Continued)

FOREIGN PATENT DOCUMENTS

| CN | 203190750 U    | 9/2013 |
| WO | WO2012062980 A1 | 5/2012 |
| WO | WO2012131188 A1 | 10/2012 |

OTHER PUBLICATIONS

French Search Report corresponding to French application No. FR 1850736, dated Sep. 25, 2018, 2 pages.

*Primary Examiner* — Joseph D. Pape
*Assistant Examiner* — Dana D Ivey
(74) *Attorney, Agent, or Firm* — Reising Ethington P.C.

(57) ABSTRACT

A vehicle trim includes a support, a display screen fixed on the support, and a covering that covers the screen, the covering having a visible front face and a back face turned toward the screen. An image generated by the screen is visible on the front face of the covering. The covering has an optical layer applied on the screen with no empty space between the optical layer and the screen.

16 Claims, 5 Drawing Sheets

(51) Int. Cl.
  *B60K 37/04*   (2006.01)
  *G06F 1/16*    (2006.01)
  *B60K 37/00*   (2006.01)
  *B60Q 3/14*    (2017.01)
  *B60Q 3/54*    (2017.01)

(52) U.S. Cl.
  CPC .... *B60K 2370/688* (2019.05); *B60K 2370/81* (2019.05); *B60K 2370/98* (2019.05); *B60R 2013/0287* (2013.01)

(56) References Cited

U.S. PATENT DOCUMENTS

2014/0085258 A1* 3/2014 Beraud .................. B60K 35/00
                                                     345/174
2017/0162176 A1* 6/2017 Benchikhi ................ G09G 5/10

* cited by examiner

VEHICLE TRIM COMPRISING A DISPLAY SCREEN AND MANUFACTURING METHOD

FIELD OF THE INVENTION

The present invention relates to the field of vehicle trim incorporating a display screen.

SUMMARY OF THE INVENTION

One of the aims of the invention is to propose vehicle trim comprising a display screen covered by a covering, the trim having a high perceived quality while being easy and economical to manufacture.

To that end, the invention in at least some embodiments proposes a vehicle trim comprising a support, a display screen fixed on the support and an aspect covering that covers the screen, the covering having a visible front face and a back face turned toward the screen, an image generated by the screen being visible on the front face of the covering, the covering comprising an optical layer applied over the screen with no empty space between the optical layer and the screen.

In specific example embodiments, the trim comprises one or more of the following optional features, considered individually or according to any technically possible combination:

- the optical layer is made from polyurethane, in particular cross-linked polyurethane, or polyester;
- it comprises a seal inserted between the support and the screen;
- the optical layer is overmolded on the screen;
- the covering comprises an aspect layer that covers the optical layer;
- the aspect layer has a light transmission rate of between 35% and 45%;
- the optical layer forms a lens configured so that an image generated by the screen is sharp on the front face of the covering.

The invention also relates to a method for manufacturing vehicle trim comprising a support, a display screen configured to generate an image and fixed on the support, and a covering that covers the screen, the covering having a visible front face and a back face turned toward the screen, an image generated by the screen being visible on the front face of the covering, the method comprising providing the screen and the support, and shaping an optical layer of the covering on the screen.

In specific example embodiments, the manufacturing method comprises one or more of the following optional features, considered individually or according to any technically possible combination:

- the optical layer is molded on the screen, for example by compression or injection;
- the optical layer is applied by spraying on the screen;
- the manufacturing method comprises spraying a portion of the optical layer on the screen such that the portion of optical layer covering the screen is flush with a face of the support, then spraying the remaining portion of the optical layer on the screen and the support;
- the manufacturing method comprises inserting a seal between the screen and the support;
- the manufacturing method comprises applying an aspect layer on the optical layer, the coat having a light transmission rate of between 35% and 45%;
- the optical layer is formed so as to define an optical lens configured so that an image generated by the screen is sharp on the front face of the coating.

BRIEF DESCRIPTION OF THE DRAWINGS

The invention and its advantages will be better understood upon reading the following description, provided solely as a non-limiting example, and done in reference to the appended drawings, in which.

DETAILED DESCRIPTION OF PREFERRED EMBODIMENTS

Figure 1:
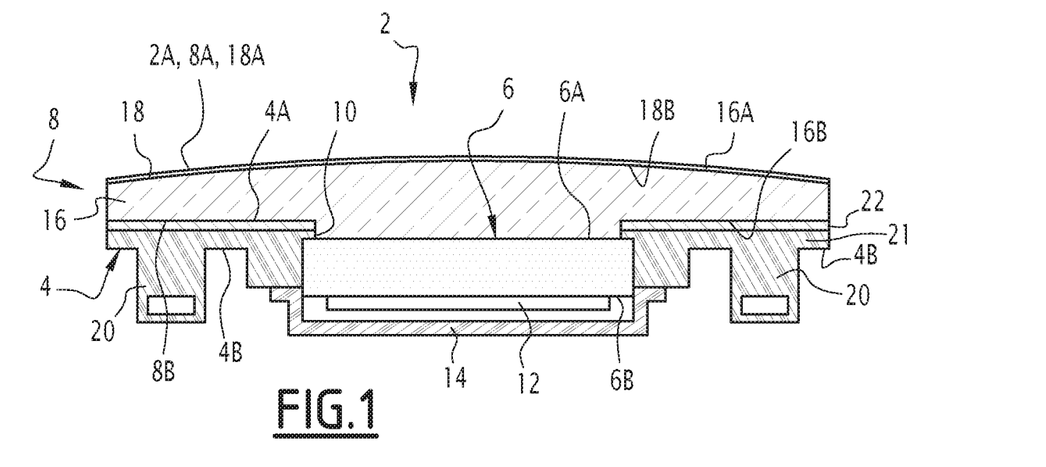
FIG. 1 is a schematic sectional view of trim.

The trim 2 of FIG. 1 is interior vehicle trim. It is for example arranged on a dashboard, a center console or the backrest of a seat of the vehicle.

In the continuation of the description, the terms "front" and "back" are used in reference to the trim 2, the front being located on the visible side of the trim 2 when the trim 2 is installed in the vehicle, and the back being located on the opposite side. The front side of the trim 2 is generally turned toward the inside of the vehicle.

The trim 2 has a front face 2A intended to be visible. The front face 2A is turned toward the inside of the vehicle.

The trim 2 comprises a support 4, a display screen 6 fixed on the support 4, and a covering 8 that covers the screen 6. In the illustrated example, the covering 8 also covers the support 4.

The support 4 has a front face 4A and a back face 4B that are opposite one another. The front face 4A of the support 4 faces the front face 2A of the trim.

The support 4 comprises an opening 10 passing through the support 4. The opening 10 extends between the back face 4B and the front face 4A of the support 4.

The screen 6 extends through the opening 10. The screen 6 is visible through the opening 10. The screen 6 here is applied on the back face 4B of the support 4 and extends through the opening 10.

The screen 6 is configured to generate images. The screen 6 is preferably configured to generate different images. Each image is for example generated from a digital image, i.e., a file storing the image in binary form. The screen 6 is preferably suitable for displaying animated images, i.e., series of elementary images creating the impression of an animation.

The screen 6 is for example formed by a matrix of pixels. Each pixel can be controlled individually to generate a desired image. In particular, each pixel can be controlled individually to display a determined color, each pixel being suitable for taking one color from among a plurality of different colors.

The screen 6 for example has a graphic controller capable of controlling each pixel based on a digital file representing an image, to display said image on the screen 6.

The screen 6 is for example a light-emitting screen, in particular a light-emitting diode (LED) screen, in particular an organic light-emitting diode (OLED) screen.

Alternatively, the screen 6 is a liquid crystal display (LCD) screen.

The screen 6 is advantageously an active matrix screen. Such a screen has an active matrix comprising one or several transistors dedicated to each pixel of the screen 6 and making it possible to control each pixel individually. The active matrix is for example of the TFT (thin film transistor) type. The active matrix screen 6 can be an AMOLED (active matrix organic light-emitting diode) screen or an AMLCD (active matrix liquid crystal display) screen. Active matrix screens can be designed to be flexible, in particular AMOLED screens, which can be advantageous in an embodiment in which the screen 6 is deformed, as will be illustrated hereinafter.

The screen 6 has a front face 6A and a back face 6B that are opposite one another. The front face 6A is intended to be visible. The front face 6A of the screen 6 faces the front face 2A of the trim 2.

The images are generated by the screen 6 on its front face 6A, which defines the display surface of the screen 6.

The trim 2 comprises control electronics 12 configured to control the screen 6. The control electronics 12 are for example fixed on the back face 6B of the screen 6. The control electronics 12 here assume the form of an electronic board fixed on the back face 6B of the screen 6.

Optionally, as illustrated in FIG. 1, the trim 2 comprises a cover 14 fixed on the back face 4B of the support 4. The cover 14 covers the back face 6B of the screen 6. The cover 14 is fixed on the support 4 around the opening 10.

The covering 8 has a front face 8A, intended to be visible, and a back face 8B, facing the screen 6. The front face 8A of the covering 8 defines the visible front face 2A of the trim 2. The back face 8B of the covering 8 is in contact with the respective front faces 4A, 6A of the support 4 and the screen 6.

The covering 8 comprises an optical layer 16 at least partially defining the back face 8B of the covering 8. The optical layer 16 is applied on the screen 6.

The trim 2 has no empty space between the optical layer 16 and the front face 6A of the screen 6. The optical layer 16 here is in contact with the front face 6A of the screen 6.

In the example of FIG. 1, the optical layer 16 is also in contact with the front face 4A of the support 4, with no empty space between the optical layer 16 and said front face 4A of the support 4.

Preferably, the optical layer 16 forms a lens configured so that an image generated by the screen 6 is sharp on the front face 8A of the covering 8, forming the visible front face 2A of the trim 2.

In the example of FIG. 1, the screen 6 has a planar front face 6A. The optical layer 16 has a back face 16B that is planar in register with the screen 6. The optical layer 16 has a front face 16A that is convex in line with the screen 6. In one possible alternative, the screen 6 has a curved front face 6A, for example convex, the optical layer 16 having a concave back face 16B in register with the screen 6 and/or the optical layer 16 has a planar front face 16A.

The optical layer 16 is transparent or translucent, and may or may not be dyed.

Relative to a transparent undyed optical layer 16, a dyed transparent optical layer 16 or a translucent optical layer 16 makes it possible to reduce the visibility of the screen 6 in the absence of an image generated by the screen 6, by making it less visible through the optical layer 16. A translucent and dyed layer makes it possible to still further reduce the visibility of the screen 6 in the absence of an image generated by the latter.

In one embodiment, the optical layer 16 is made from polyurethane (PUR). In one embodiment, the optical layer 16 is made from cross-linked polyurethane.

Optionally, and as illustrated in FIG. 1, the covering 8 comprises an aspect layer 18 covering the optical layer 16 on the side of the front face 8A of the covering 8. The aspect layer 18 forms the superficial layer of the covering 8, and the trim 2.

The aspect layer 18 defines the front face 8A of the covering 8, which is also the front face 2A of the trim 2.

In one embodiment, the aspect layer 18 is dyed. Advantageously, the aspect layer 18 has a light transmission rate of between 35% and 45%.

Such an aspect layer 18 makes it possible to reduce the visibility of the screen 6 in the absence of an image generated by the screen 6. Indeed, in the absence of an image generated by the screen 6, the covering 8 has a uniform appearance, and, when an image is generated by the screen 6, this image appears on the aspect layer 18 in line with the screen 6.

The covering 8 comprising the optical layer 16 and at least one other layer, for example the aspect layer 18, is a multilayer coating.

In one alternative, the covering 8 is a single layer. The aspect layer 8 comprises only the optical layer 16. The optical layer 16 then defines the front face 8A of the covering 8 and therefore the front face 2A of the trim 2.

In the illustrated example, the support 4 comprises fastening members 20 for fixing it to the inside of the vehicle. The fastening members 20 here assume the form of fastening tabs.

Optionally, as illustrated in FIG. 1, the support 4 comprises a support body 21 and a support film 22 covering the support body 21. The support film defines the front face 4A of the support 4, and the support body 21 defines the back face 4B of the support 4.

In one embodiment, the support film 22 is a decorative film, for example bearing decorative patterns visible on the front face 8A of the covering 8.

Alternatively or optionally, the support film 22 is a touch-sensitive film configured to detect interactions of the user with the trim 2. The touch-sensitive support film 22 is in particular configured to detect when the user touches the covering 8. The touch-sensitive support film 22 is for example configured to allow a user to enter instructions relative to content displayed on the screen 6.

Alternatively, the support 4 has no support film 22.

Successive steps of a method for manufacturing the trim of FIG. 1 are described in reference to FIGS. 2 to 5.

Figure 2:
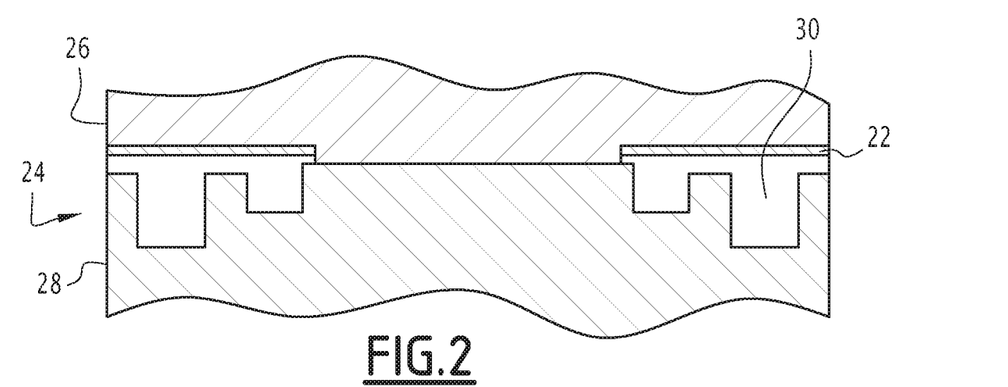
FIGS. 2 to 5 are schematic sectional views illustrating successive steps of a manufacturing method of the trim.

The manufacturing method comprises providing the support (FIG. 2).

As illustrated in FIG. 2, the support 4 is manufactured by overmolding the support film 22, for example by injection or compression molding.

The molding is done in a support mold 24 comprising two mold parts 26, 28 delimiting a molding cavity 30 between them. The support film 22 is arranged on a mold surface defined on a mold part 26, 28, then material is molded in the mold between the two mold parts 26, 28 to form the support body 21.

In an embodiment in which the trim 2 has no support film 22, the support 4 is for example manufactured by injection or compression molding.

Figure 3:
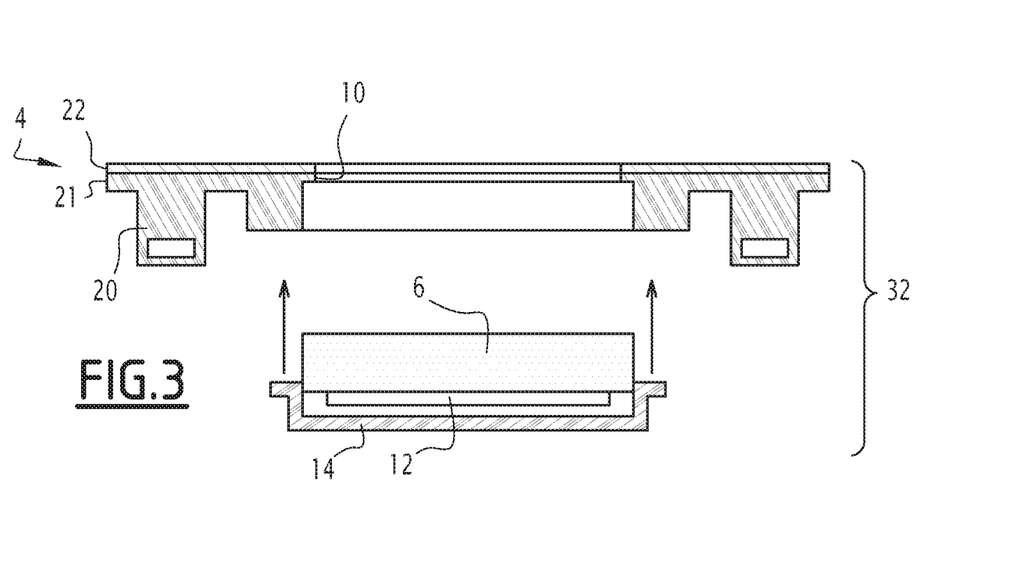

The manufacturing method next comprises attaching the screen 6 on the support 4 so as to obtain an assembly 32 (FIG. 3).

The fastening of the screen 6 is done appropriately, for example by gluing, screwing, riveting and/or welding. The screen 6 here is fixed on the back face 4B of the support 4.

The manufacturing method optionally comprises fixing a cover 14. The fixing of the cover 14 is also done appropriately, for example by gluing, screwing, riveting and/or welding. The cover 14 is part of the assembly 32.

Figure 4:
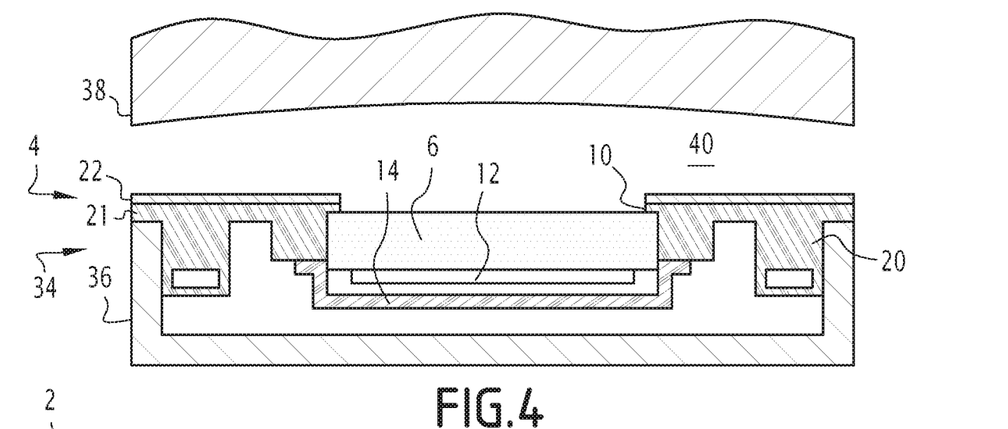

The manufacturing method comprises shaping the optical layer 16 on the support 4 and the screen 6 (FIG. 4).

The optical layer 16 is for example overmolded on the support 4 and the screen 6, more particularly on respective front faces 4A, 6A of the support 4 and the screen 6, for example by injection molding or compression molding.

As illustrated in FIG. 4, the assembly 32 comprising the support 4 and the screen 6 is positioned in an optical layer mold 34, comprising two mold parts 36, 38. The assembly 32 is positioned on one mold part 36 and defines, with the other mold part 38, a molding cavity 40 for the optical layer 16.

In one embodiment, the optical layer mold 34 is closed and the material of the optical layer 16 is injected into the molding cavity 40. This is injection molding.

Alternatively, material of the optical layer 16 is introduced into the at least partially open optical layer mold 34, then the optical layer mold 34 is closed so as to compress the material of the optical layer 16 and shape it against the support 4 and the screen 6. This is compression molding.

Optionally, the method comprises applying the aspect layer 18 on the optical layer 16.

In one embodiment, the aspect layer 18 is provided in the form of a film.

Figure 5:
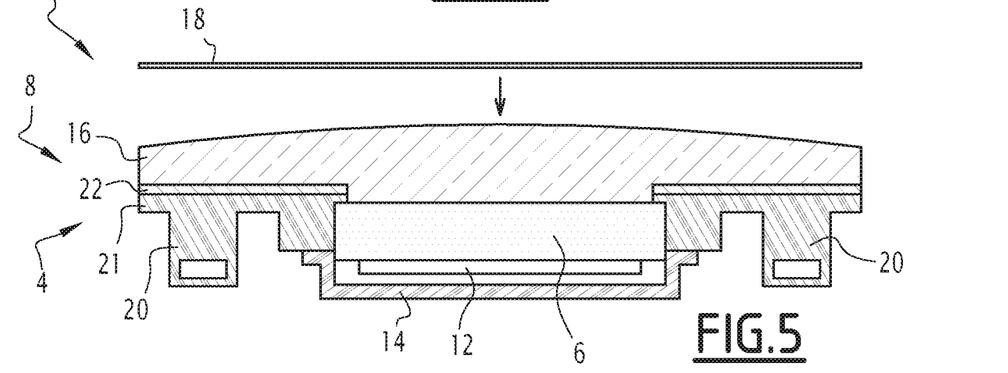

In one embodiment illustrated in FIG. 5, the aspect layer 18 provided in the form of a film is placed and glued on the optical layer 16.

Figure 6:
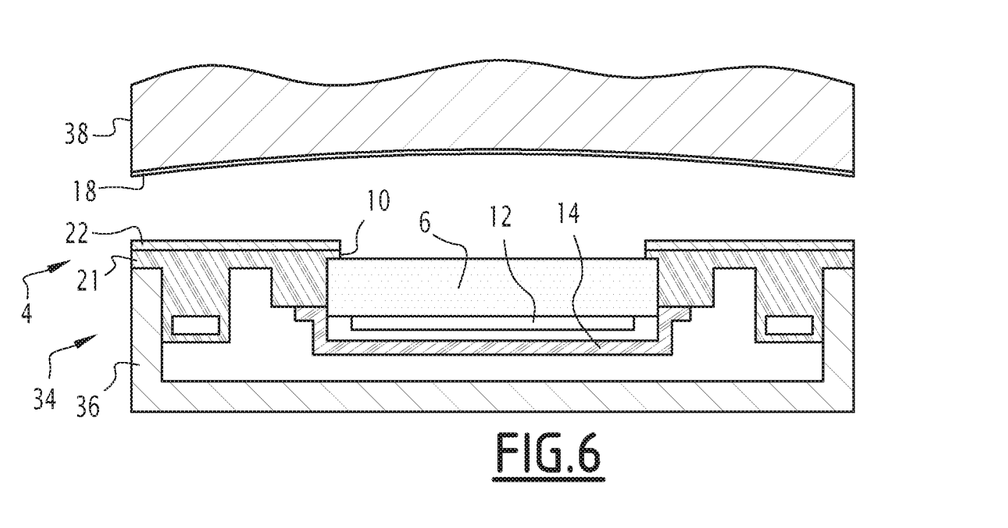
FIG. 6 illustrates a step of a manufacturing method according to an alternative.

In another embodiment illustrated in FIG. 6, the optical layer 16 is for example molded between, on the one hand, the support 4 and the screen 6, and on the other hand, the aspect layer 18 provided in the form of a film. The aspect layer 18 is positioned inside the optical layer mold 16 against a molding surface. The aspect layer 18 is pressed against the molding surface for example by suction, by an electrostatic force, and/or by a mechanical holding device. The molding is done by injection or compression.

In another embodiment, the aspect layer 18 is formed by spraying on the optical layer 16 previously formed, for example by overmolding on the support 4 and the screen 6.

Figure 7:
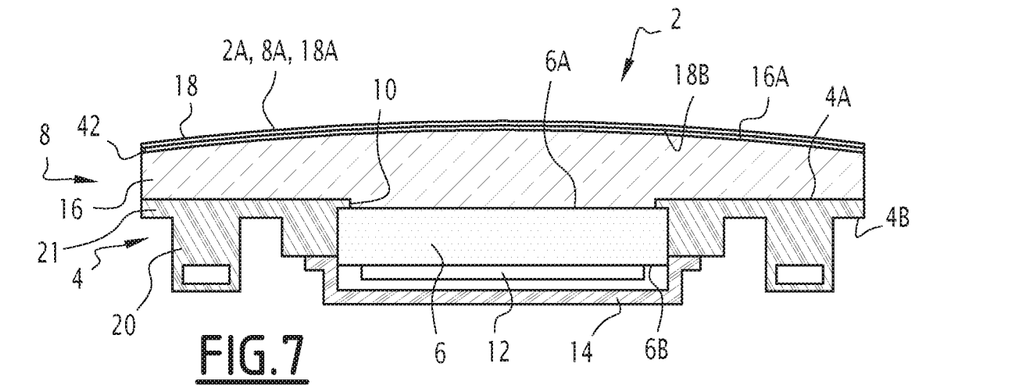
FIG. 7 illustrates trim according to an alternative.

The trim 2 of FIG. 7 differs from that of FIG. 1 in that the covering 8 comprises a touch-sensitive coating film 42 covering the optical layer 16. In this case, the support 4 has no touch-sensitive support film 22.

The coating film 42 is transparent, at least across from the screen 16, such that the image generated by the screen 16 is visible through the coating film 42.

The coating film 42 is applied on the optical layer 16 similarly to what was described above for the aspect layer 18 supplied in the form of a film: by gluing on the optical layer 16 previously formed (FIG. 5) or by molding of the optical layer 16 between, on the one hand, the support 4 and the screen 6, and on the other hand, the coating film 42 (FIG. 6).

Optionally, as illustrated in FIG. 7, the covering 8 comprises a aspect layer 18 covering the coating film 42. The aspect layer 18 is for example provided in the form of a film and applied on the coating film 42 or manufactured by spraying on the coating film 42.

Furthermore, the trim 2 of FIG. 7 differs from that of FIG. 1 in that the support 4 has no support film 22 and is therefore formed by the support body 21. Alternatively, the trim 2 may comprise a support film 22.

Successive steps of a manufacturing method according to an alternative embodiment are illustrated in FIGS. 8 to 11.

The manufacturing method of FIGS. 8 to 11 comprises, like before, providing the support 4 and fixing the screen 6 on the support 4. These steps are not illustrated again.

Figure 8:
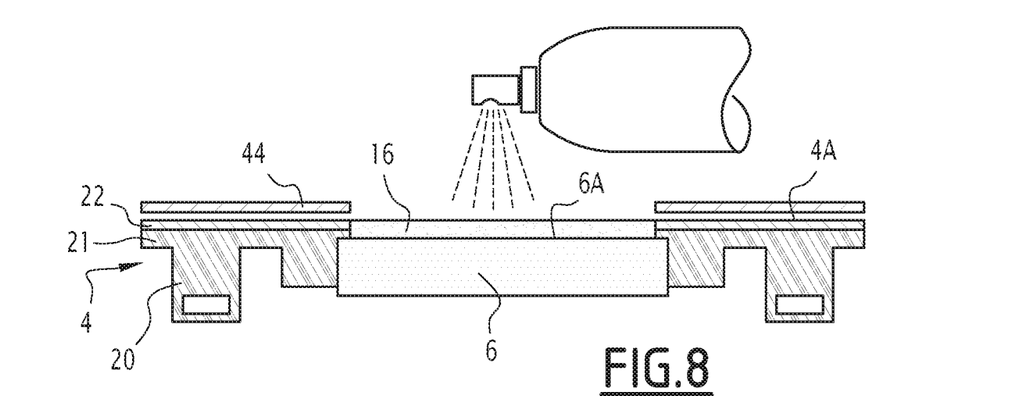
FIGS. 8 to 11 are schematic sectional views illustrating successive steps of a manufacturing method according to an alternative.

The support 4 here is provided with no decorative and/or touch-sensitive support film. Of course, optionally, it is provided with a decorative and/or touch-sensitive support film.

The manufacturing method comprises shaping the optical layer 16 on the support 4 and the screen 6 by spraying material of the optical layer 16 on the support 4 and the screen 6, more specifically on the respective front faces 4A, 6A of the support 4 and the screen 6. In this embodiment, the optical layer 16 is made from polyester.

The front face 6A of the screen 6 here is withdrawn from the front face 4A of the support 4. The spraying of the optical layer 16 is preferably done sequentially in two phases comprising:

a first spraying phase (FIG. 8) during which material of the optical layer 16 is sprayed only on the screen 6, without being sprayed on the support 4 around the screen 6, so as to fill in the level difference between the front face 6A of the screen 6 and the front face 4A of the support 4 (FIG. 9), then a second spraying phase (FIG. 10) during which material of the optical layer 16 is sprayed in line with the screen 6 and on the support 4.

Figure 9:
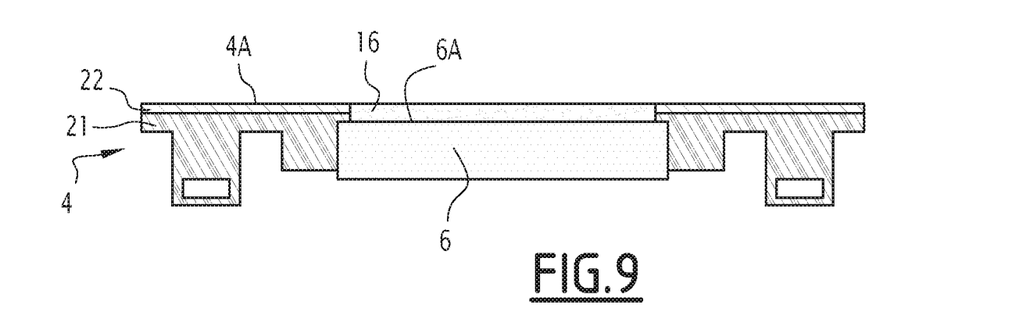

The first spraying phase (FIG. 8) is carried out until the sprayed material covering the front face of the screen 6 is level with the front face 4A of the support 4 (FIG. 9).

Figure 10:
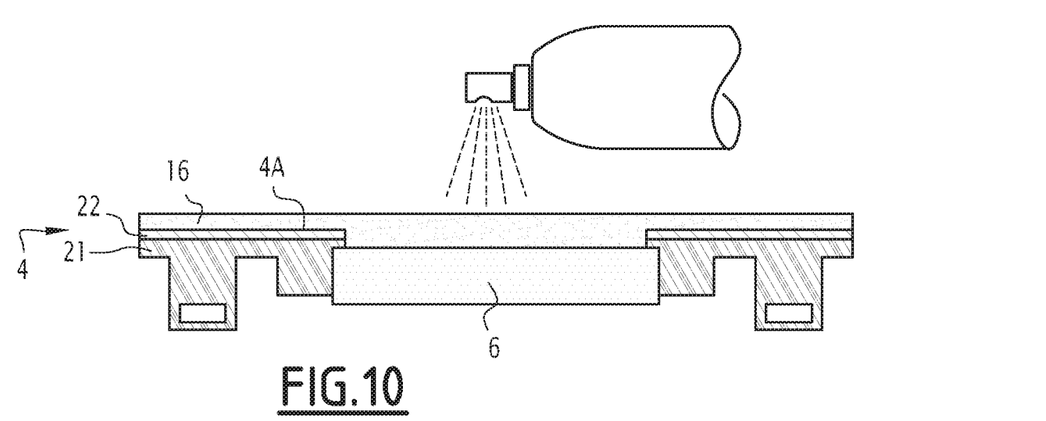

During the first spraying phase (FIG. 8), a mask 44 is placed on the front face 4A of the support 4 around the screen 6 to avoid spraying material on the front face 4A of the support 4. The mask 44 is removed for the second spraying phase (FIG. 10).

According to another embodiment, the first spraying phase on the screen is done before assembling the screen and the support. The manufacturing method then comprises spraying material of the optical layer 16 on the screen 6 not assembled to the support 4 to arrive at a thickness allowing a level flush with the front face 4A of the support 4, then the assembly of the screen 6 and the support 4, then the second phase of spraying material of the optical layer in line with the screen 6 and on the support 4.

To achieve a certain thickness by spraying, it may prove necessary to make several successive passes, and wait for the sprayed material to dry between each pass and the following pass. The spraying by successive passes is done during the first spraying phase and/or the second spraying phase.

In one embodiment, the optical layer 16 obtained by spraying has a thickness of between 0.8 and 1.5 mm. The thickness obtained after a spraying pass is for example about 0.10 mm to 0.15 mm, typically 0.13 mm. Around ten passes thus make it possible to obtain the desired thickness.

Figure 11:
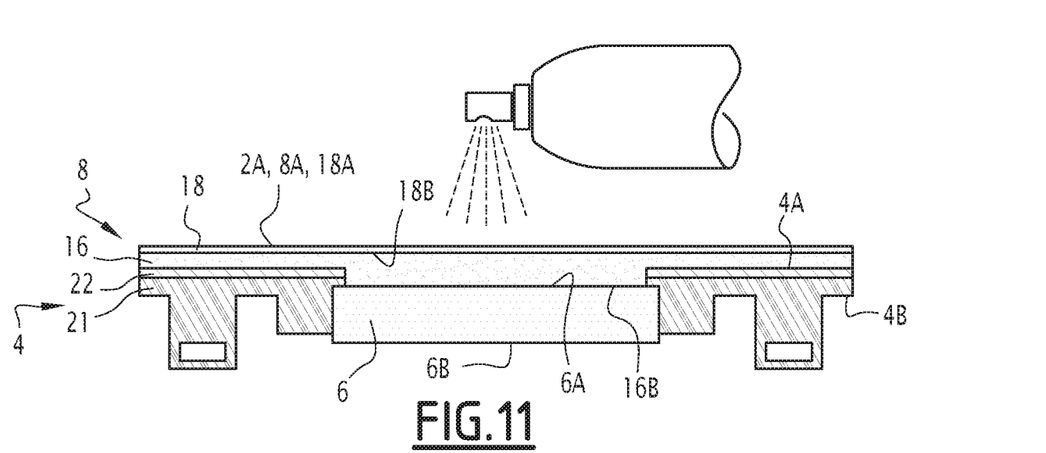

Optionally, the manufacturing method comprises forming an aspect layer 18 on the optical layer 16 (FIG. 11). The aspect layer 18 is also for example made by spraying, as illustrated in FIG. 11. Alternatively, the aspect layer 18 is provided in the form of a film and deposited on the optical layer 16 obtained by spraying. The aspect layer 18 provided in the form of a film is for example glued on the optical layer 16.

Optionally, the covering 8 comprises a decorative and/or touch-sensitive coating film 42 covering the optical layer 16. The coating film 42 is for example glued on the optical layer 16 obtained by spraying. The covering 8 then optionally comprises an aspect layer 18 that is sprayed on the coating film 42 or provided in the form of a film and glued on the aspect layer 18.

Figure 12:
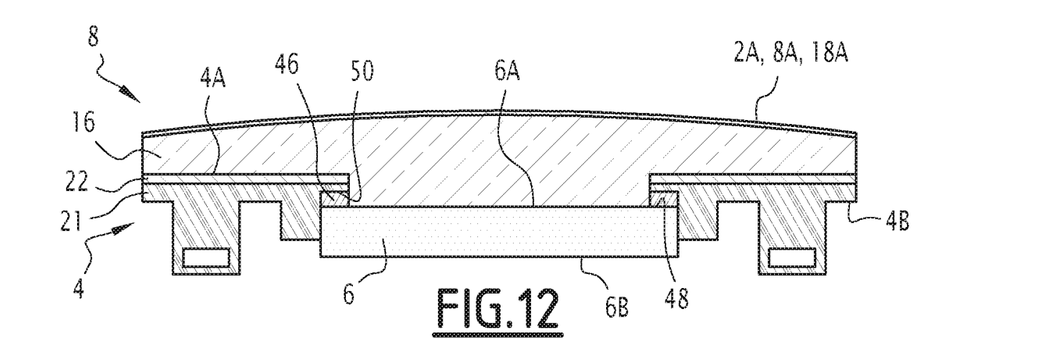
FIG. 12 is a schematic sectional view of trim according to an alternative.

As illustrated in FIG. 12, optionally, the trim comprises a sealing gasket 46 inserted between the screen 6 and the support 4.

The sealing gasket 46 is inserted between a peripheral region 48 of the front face 6A of the screen 6 and a surface of the support 4 against which the screen 6 bears, here a shoulder 50 defined on the back face 4B of the support 4.

The sealing gasket 46 is sealed against the material of the optical layer 16 melted during molding or sprayed during spraying. The sealing gasket 46 prevents the material of the optical layer 16 from passing between the screen 6 and the support 4.

Preferably, the sealing gasket 46 is compressible. This makes it possible to absorb play between the support 4 and the screen 6, which may be due to machining allowances, and to provide effective sealing. This also imparts impact resistance, the sealing gasket 46 being able to absorb part of the energy from an impact.

Figure 13:
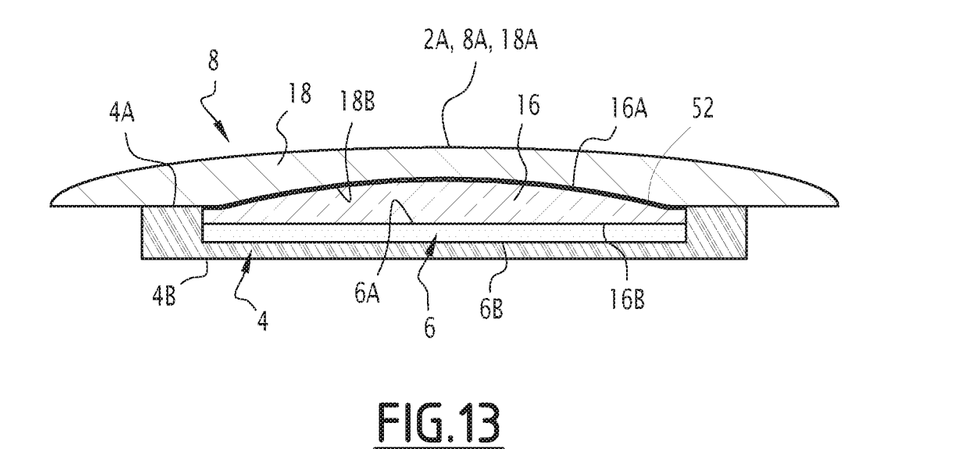
FIGS. 13 and 14 are schematic sectional views of trim.

In the example of FIG. 13, the covering 8 comprises an aspect layer 18 having a front face 18A that is convex at least in line with the screen 6, here over the entire expanse of the aspect layer 18.

The aspect layer 18 is self-supporting, i.e., it has a stable shape. It is for example provided in the form of a shell.

The front face 6A of the screen 6 is planar. The back face 18B of the aspect layer 18 here is convex at least in line with the screen 6. Alternatively, the back face 18B of the aspect layer 18 is planar in line with the screen 6.

The optical layer 16 fills the space between the front face of the screen 6 and the back face of the aspect layer 18, such that the trim 2 has no empty space between the screen 6 and the front face 8A of the covering 8, at least in line with the screen 6. The optical layer 16 has no empty space, and the trim 2 has no empty space between the optical layer 16 and the screen 6, and between the optical layer 16 and the covering 8, at least in line with the screen 6.

Optionally, the trim 2 comprises a transparent touch-sensitive film 52 positioned between the aspect layer 18 and the optical layer 16 in line with the screen. Alternatively, the touch-sensitive film 52 is positioned between the optical layer 16 and the screen 6. Alternatively, the screen 6 is a touch-sensitive screen, and for example natively comprises a touch-sensitive film integrated into the screen 6.

A method for manufacturing the trim 2 according to FIG. 13 comprises providing the optical layer 16 in viscous state between the aspect layer 18 and the screen 6, then fixing the screen 6 and the aspect layer 18 on one another, the optical layer 16 being shaped between the screen 6 and the aspect layer 18. The optical layer 16 is molded between the screen 6 and the aspect layer 18.

The aspect layer 18 having a stable shape, it is not necessary to provide a mold. The molding of the optical layer 16 can thus be done with a low pressure, limiting the risks of damaging the screen 6 during molding.

If applicable, the touch-sensitive film 52 is arranged on the front face 6A of the screen 6 before fixing the screen 6 and the aspect layer 18 on one another with the optical layer 16 provided between the two. In this case, the screen comprises a touch-sensitive film that covers the front face 6A.

With such trim 2, it is possible to provide trim 2 whereof the front face 2A has a high curve radius, forming an image with sufficient sharpness on the visible face 2A of the trim 2. The screen 6 is deformed little or not at all.

Alternatively, the optical layer 16 can next be formed according to any one of the methods already mentioned above.

Figure 14:
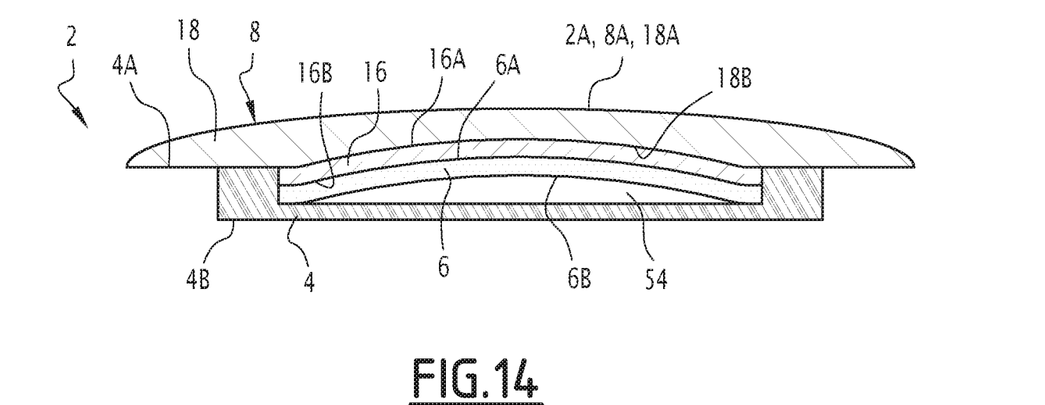

The example of FIG. 14 differs from that of FIG. 13 in that the support 4 is configured such that the screen 6 mounted on the support 4 is prestressed so as to be deformed, the front face 6A of the screen 6 being made convex.

The back face 18B of the aspect layer 18 is concave. The optical layer 16 has a convex front face 16A complementary to the back face 18B of the concave aspect layer 18, and a concave back face 16B complementary to the front face 6A of the screen 6.

To manufacture the trim 2, it is possible to provide a support 4 having a housing 54 for the screen 6, the housing 54 having an adjustable size, for example using a screw/nut system, to insert the screen 6 into the housing 54, then to reduce the adjustable size of the housing 54 such that the screen 6 is prestressed and deforms such that its front face 6A is convex.

In an example embodiment, the manufacturing method comprises fixing the screen 6 on the support 4, then tightening a screw of a screw-nut system making it possible to apply a first pressure on the screen 6 making it possible to curve the screen 6, then applying the optical layer 16 according to a means previously mentioned, then assembling the screen 6 and the support 4 on the back face of the aspect layer 18, then additional tightening of the screw to apply a second final pressure (greater than the first pressure). The screw is for example tightened to its maximum tightening level. In this case, the aspect layer 18 must have a curve radius greater than the curve radius of the screen 6 after tightening of the screw to apply the second pressure, in particular at the maximum tightening level of the screw.

According to another embodiment, the screen 6 is manually inserted between two mechanical stops of the support 4 while being deformed.

The optical layer 16 can next be formed according to any one of the methods already mentioned above.

The optical layer 16 can also be an optical film. In this embodiment, it is preferable to provide an adhesive on one of the two faces of the optical film making up the optical layer 16, in order to guarantee a good optical transmission without air bubbles between the screen 6 and the optical layer 16 and between the screen 6 and the aspect layer 18.

In the examples illustrated in FIGS. 1 to 14, the optical layer 16 of the covering 8 is applied on the screen 6 without empty space between the screen 6 and the optical layer 16. The covering 8 has no empty space between the optical layer 16 and the visible front face 8A of the covering 8. This is favorable to the transmission of light from the screen 6 toward the front face 8A of the covering 8 and the quality of the image formed on the front face 8A of the covering 8.

The covering 8 covering the support 4 and the screen 6 visually provides surface continuity, which is favorable to the quality perceived by the user. In particular, when the covering 8 comprises a dyed aspect layer 18, it makes it possible to produce a visual masking effect of the screen 6 when the latter is not generating an image.

An optical layer 16 defining an optical lens makes it possible to provide a display of the image generated by the screen 6 that is sharp on the front face of the covering 8.

The optical layer 16 formed on the screen 6, in particular by molding, particularly by injection or compression molding or by spraying, makes it possible to form the optical layer 16 on the screen 6 with no empty space between the optical layer 16 and the screen 6.

The presence of a touch-sensitive film, integrated into the support 4 or the covering 8, makes it possible to increase the functionalities of the trim 2 while allowing the user to use the trim 2 as man-machine interface device allowing him to interact with the screen 6.

The invention is not limited to the various embodiments and alternatives described above. In particular, the different examples can be combined.

For example, in the embodiments of FIGS. 1 to 12, the coating covers the screen 6 and the support 4. In one possible alternative, the covering 8 covers only the screen 6.

The invention claimed is:

1. Vehicle trim comprising a support, a display screen fixed on the support, and a covering that covers the screen, a front face of the screen being configured for emitting light and comprising a matrix of pixels, the covering having a visible front face and a back face turned toward the screen, an image generated on the front face of the screen being visible on the front face of the covering, the covering comprising an optical layer shaped onto the front face of the screen with no empty space between the optical layer and the screen, wherein the optical layer is overmolded on the screen.

2. The trim according to claim 1, wherein the optical layer is made from polyurethane or polyester.

3. The trim according to claim 1, wherein the optical layer is made from cross-linked polyurethane.

4. The trim according to claim 1, comprising a seal inserted between the support and the screen.

5. The trim according to claim 1, wherein the covering comprises an aspect layer that covers the optical layer.

6. The trim according to claim 5, wherein the aspect layer has a light transmission rate of between 35% and 45%.

7. The trim according to claim 1, wherein the optical layer forms a lens configured so that the image generated by the screen is sharp on the front face of the covering.

8. The trim according to claim 1, wherein the optical layer has a non-uniform thickness.

9. The trim according to claim 1, wherein the optical layer is formed from a single material.

10. A method for manufacturing vehicle trim comprising a support, a display screen configured to generate an image on a front face of the screen and fixed on the support, and a covering covering the screen, the front face of the screen being configured for emitting light and comprising a matrix of pixels, the covering having a visible front face and a back face turned toward the screen, the image generated by the screen being visible on the front face of the covering, the method comprising providing the screen and the support, and shaping an optical layer of the covering on the screen so that there is no empty space between the optical layer and the screen, wherein the shaping is performed by compression molding, by injection molding, or by spraying.

11. The manufacturing method according to claim 10, the manufacturing method comprising spraying a portion of the optical layer on the screen such that the portion of the optical layer on the screen is flush with a face of the support, then spraying a remaining portion of the optical layer on the screen and the support.

12. The manufacturing method according to claim 10, comprising inserting a seal between the screen and the support.

13. The manufacturing method according to claim 10, comprising applying an aspect layer on the optical layer, the aspect layer having a light transmission rate of between 35% and 45%.

14. The manufacturing method according to claim 10, the optical layer being formed so as to define an optical lens configured so that the image generated by the screen is sharp on the front face of the covering.

15. Vehicle trim comprising a support, a display screen fixed on the support, and a covering that covers the screen, a front face of the screen being configured for emitting light and comprising a matrix of pixels, the covering having a visible front face and a back face turned toward the screen, an image generated on the front face of the screen being visible on the front face of the covering, the covering comprising an optical layer applied on the screen with no empty space between the optical layer and the screen, wherein a front face of the optical layer is convex.

16. The trim according to claim 15, wherein the front face of the display screen is planar and a rear face of the optical layer is planar.

* * * * *